(12) United States Patent
Sprecher et al.

(10) Patent No.: US 12,544,386 B2
(45) Date of Patent: Feb. 10, 2026

(54) METHOD AND COMPOSITION FOR TREATMENT OF SKIN DISEASES ASSOCIATED WITH ACCELERATED CORNEODESMOSOMES DEGRADATION OR WEAKER CELL-CELL ADHESION

(71) Applicants: ICHILOV TECH LTD, Tel Aviv (IL); RAMOT AT TEL-AVIV UNIVERSITY LTD., Tel-Aviv (IL)

(72) Inventors: Eli Sprecher, Givatayim (IL); Ofer Sarig, Ramat Yishai (IL); Janan Mohamad, Kawkab Abu El-Hija (IL); Alon Peled, Tel Aviv (IL)

(73) Assignees: ICHILOV TECH LTD, Tel Aviv (IL); RAMOT AT TEL-AVIV UNIVERSITY LTD., Tel Aviv (IL)

( * ) Notice: Subject to any disclaimer, the term of this patent is extended or adjusted under 35 U.S.C. 154(b) by 950 days.

(21) Appl. No.: 17/610,276

(22) PCT Filed: May 13, 2020

(86) PCT No.: PCT/IL2020/050516
§ 371 (c)(1),
(2) Date: Nov. 10, 2021

(87) PCT Pub. No.: WO2020/230127
PCT Pub. Date: Nov. 19, 2020

(65) Prior Publication Data
US 2022/0226348 A1 Jul. 21, 2022

Related U.S. Application Data
(60) Provisional application No. 62/848,062, filed on May 15, 2019.

(51) Int. Cl.
*A61K 31/56* (2006.01)
*A61K 9/00* (2006.01)
(Continued)

(52) U.S. Cl.
CPC ............ *A61K 31/56* (2013.01); *A61K 9/0014* (2013.01); *A61K 47/06* (2013.01); *A61P 17/00* (2018.01)

(58) Field of Classification Search
None
See application file for complete search history.

(56) References Cited

U.S. PATENT DOCUMENTS

| | | | |
|---|---|---|---|
| 2006/0003948 A1* | 1/2006 | Krasutsky | A61K 8/37 514/35 |
| 2012/0231054 A1 | 9/2012 | Scheffler | |
| 2019/0125826 A1* | 5/2019 | Bodemer | C12Q 1/6883 |

FOREIGN PATENT DOCUMENTS

| | | |
|---|---|---|
| EP | 1267900 A1 | 1/2003 |
| WO | 2018017576 A1 | 1/2018 |

OTHER PUBLICATIONS

Cork et al., Epidermal Barrier Dysfunction in Atopic Dermatitis, Journal of Investigative Dermatology, vol. 129, Issue 8, 2009, pp. 1892-1908 (Year: 2009).*

(Continued)

*Primary Examiner* — Jeffrey S Lundgren
*Assistant Examiner* — Anthony Joseph Seitz
(74) *Attorney, Agent, or Firm* — FISHERBROYLES, LLP; Roger L. Browdy

(57) ABSTRACT

The present invention provides a method and a pharmaceutical composition for treatment of skin diseases associated with accelerated corneodesmosomes degradation and/or weaker cell-cell adhesion, such as a peeling skin syndrome, Netherton syndrome, and atopic dermatitis.

16 Claims, 2 Drawing Sheets

(51) Int. Cl.
*A61K 47/06* (2006.01)
*A61P 17/00* (2006.01)

(56) References Cited

OTHER PUBLICATIONS

Kose et al., 2012 (Year: 2012).*
Condrat et al; "Junctional epidermolysis bullosa: Heterogeneity and mutation stratifaction for precision medicine", Frontiers in Medicine, 5, 363 . (2019).
Ishida-Yamamoto et al; "Desmosomes and corneodesmosomes and their relevance to genetic skin diseases". G Ital Dermal Venereol., 152, 148 . (2017).
Third Party Observation. 4 pages. isused Jul. 3, 2024.
Alfares A et al; "Peeling skin syndrome associated with novel variant in FLG2 gene". American journal of medical genetics Part A. 173(12),pp. 3201-3204. (2017).
Blaydon DC et al; "Mutations in CSTA, encoding Cystatin A, underlie exfoliative ichthyosis and reveal a role for this protease inhibitor in cell-cell adhesion". American journal of human genetics. 89(4), pp. 564-571. (2011).
Bolling MC et al; "Generalized ichthyotic peeling skin syndrome due to FLG2 mutations". The Journal of investigative dermatology. 138(8), pp. 1881-1884. (2018).
Cabral RM et al; "Whole-exome sequencing in a single proband reveals a mutation in the CHST8 gene in autosomal recessive peeling skin syndrome". Genomics. 99(4), pp. 202-208. (2012).
Candi E et al; "The cornified envelope: a model of cell death in the skin. Nature reviews". Molecular cell biology. , 6(4), 328-340. (2005).
Cassidy AJ et al; "A homozygous missense mutation in TGM5 abolishes epidermal transglutaminase 5 activity and causes acral peeling skin syndrome". American journal of human genetics. , 77(6), pp. 909-917. (2005).
Egawa G et al; "Barrier dysfunction in the skin allergy". Allergology international: official journal of the Japanese Society of Allergology. , 67(1), pp. 3-11. (2018).
Garrod D et al; "Desmosome structure, composition and function". Biochimica et biophysica acta. , 1778(3), pp. 572-587. (2008).
Goodman H. "Nikolsky sign; page from notable contributors to the knowledge of dermatology". AMA Arch Derm Syphilol. , 68(3), pp. 334-335. (1953).
Hameed A et al; "Microscopic Nikolsky's sign". Clin Exp Dermatol. , 24(4), pp. 312-314. (1999).
Has C. "Peeling skin fisorders: A paradigm for skin desquamation". The Journal of investigative dermatology., 138(8), pp. 1689-1691. (2018).
Houben E et al;. "A keratinocyte's course of life". Skin pharmacology and physiology. 20(3), pp. 122-132. (2007).
Ishida-Yamamoto A et al;. "The biology and regulation of corneodesmosomes". Cell and tissue research, 360(3), pp. 477-482. (2015).
Kemeny L et al; "Pharmacological targeting of the epidermal barrier". Current pharmaceutical design, 22(35), pp. 5373-5381. (2016) . . . .
Kose O et al; "Peeling skin diseases: 21 cases from Turkey and a review of the literature". Journal of the European Academy of Dermatology and Venereology : JEADV. 26(7), pp. 844-848. (2012).
Krunic AL et al: "Acral peeling skin syndrome resulting from a homozygous nonsense mutation in the CSTA gene encoding cystatin A". Pediatric dermatology. 30(5), pp. e87-88. (2013).
Levy SB et al; "The peeling skin syndrome". Journal of the American Academy of Dermatology. , 7(5), pp. 606-613. (1982).
Matsumoto M et al; "Targeted deletion of the murine corneodesmosin gene delineates its essential role in skin and hair physiology". Proceedings of the National Academy of Sciences of the United States of America. , 105(18), pp. 6720-6724. (2008).
Mohamad J et al; "Filaggrin 2 deficiency results in abnormal cell-cell adhesion in the cornified cell layers and causes peeling skin syndrome type A". The Journal of investigative dermatology. 138(8), pp. 1736-1743 . (2018).
Oji V et al; "Loss of corneodesmosin leads to severe skin barrier defect, pruritus, and atopy: unraveling the peeling skin disease". American journal of human genetics. , 87(2), pp. 274-281. (2010).
Pigors M et al;. "Loss-of-function mutations in SERPINB8 linked to exfoliative ichthyosis with impaired mechanical stability of intercellular adhesions". American journal of human genetics. 99(2), pp. 430-436. (2016).
Samuelov L et al; "Peeling off the genetics of atopic dermatitis-like congenital disorders". The Journal of allergy and clinical immunology. 134(4), pp. 808-815. (2014).
Smits J et al; "Plant-derived system boosts hydration and lipid barrier"; Personal care , pp. 32-36, Nov. 1, 2014.
Soni "Nikolsky's sign—A clinical method to evaluate damage at epidermal-dermal junction". J Indian Acad Oral Med Radiol , 30, pp. 68-72. (2018).
Vodo DM et al; I"dentification of functional risk variant for Pemphigus Vulgaris in the ST18 gene". PLoS Genetics 12(5), e1006008. (2016).
Ya-Xian Z et al;. "Number of cell layers of the stratum corneum in normal skin—relationship to the anatomical location on the body, age, sex and physical parameters." Arch Dermatol Res, 291, 555. (1999).
Supplementary European Search Report dated Jan. 10, 2023, from corresponding European application No. 20804955.1.

* cited by examiner

METHOD AND COMPOSITION FOR TREATMENT OF SKIN DISEASES ASSOCIATED WITH ACCELERATED CORNEODESMOSOMES DEGRADATION OR WEAKER CELL-CELL ADHESION

TECHNICAL FIELD

The present invention provides method and composition for treatment of skin diseases associated with accelerated corneodesmosomes degradation and/or weaker cell-cell adhesion, such as a peeling skin syndrome, Netherton syndrome, and atopic dermatitis.

BACKGROUND ART

The human epidermis develops from the primordial ectoderm in the course of a tightly regulated process during which keratinocytes (KCs), which form the bulk of the epidermal cells, progressively differentiate to form four successive layers of cells: the proliferating stratum basale, and three differentiated cell layers, i.e., the stratum spinosum, granulosum and corneum (Houben et al., 2007; Kemeny et al., 2016). The basal layer is populated by stem/progenitor cells that are in charge of producing all upwards layers. As stem/progenitor cells migrate upwards, they become early committed spinous cells and then differentiate into granular cells which express proteins involved in the formation of the cornified cell envelope (Candi et al., 2005; Egawa and Kabashima, 2018). This graduated differentiation process, known as cornification, culminates within the stratum corneum into the formation of the epidermal barrier (Candi et al., 2005; Egawa and Kabashima, 2018).

Adequate epidermal barrier function is also critically dependent on normal shedding of terminally differentiated keratinocytes, a process termed desquamation, which requires the dissolution of cell-cell junctions in the upper granular layers. Desquamation mainly depends on controlled degradation of specialized desmosomes found in the stratum corneum, i.e., corneodesmosomes, the extracellular component of which mainly consists of the proteins desmoglein-1 (DSG1), desmocollin-1 (DSC1), and corneodesmosin (CDSN). Accelerated desquamation and degradation of corneodesmosomes result in increased shedding of keratinocytes and epidermal barrier dysfunction.

Peeling skin syndrome (PSS) refers to a complex group of autosomal recessive disorders of cornification featuring superficial detachment of the epidermal cornified cell layers with no mucosal fragility (Kose et al., 2012; Levy and Goldsmith, 1982). Two major clinical types of PSS have been reported: localized (acral) and generalized peeling skin syndromes. Generalized PSS is further subdivided into a non-inflammatory (type A) form and an inflammatory (type B) form. This latter type also features itching, atopic diathesis, allergic reactions and failure to thrive (Kose et al., 2012).

These three clinical groups of PSS correspond to five genetic subtypes of the disease. Localized or acral PSS (PSS2, MIM609796) can be caused by mutations in two genes: TGMS (Cassidy et al., 2005), encoding transglutaminase 5, which catalyzes the formation of γ-glutamyl-ε-lysine isopeptide bonds between epidermal differentiation-associated proteins, and CSTA (Krunic et al., 2013; Blaydon et al., 2011) (PSS4, MIM607936) encoding cystatin A, a cysteine protease inhibitor. Type B generalized PSS results from mutations in CDSN (PSS1, MIM270300), encoding corneodesmosin (Oji et al., 2010), a component of the desmosomal plaques in the upper epidermal layers. Corneodesmosin is incorporated into desmosomes in the cornified layers (Garrod and Chidgey, 2008) and has been shown to play a critical role in cell-cell adhesion in both humans and animal models (Ishida-Yamamoto and Igawa, 2015; Matsumoto et al., 2008). Additional conditions which also feature inflammatory generalized peeling include Netherton syndrome (MIM256500), also associated with corneodesmosin deficiency, and severe skin dermatitis, multiple allergies and metabolic wasting (SAM; MIM615508) syndrome (Samuelov and Sprecher, 2014). Type A generalized PSS encompasses two major phenotypes: PSS type 5 (MIM617115) which features late-onset peeling over the hands, feet and knees as well as palmoplantar keratoderma and is caused by mutations in the SERPINB8 gene which encodes a serine protease inhibitor (Pigors et al., 2016); and PSS type 3 (MIM616265) which manifests with superficial and generalized peeling without pruritus or any associated signs (Cabral et al., 2012) and is caused by mutations in the FLG2 gene encoding filaggrin family member 2, which co-segregated with PSS3 (Alfares et al., 2017; Bolling et al., 2018; Mohamad et al., 2018). The various forms of PSS can be caused by mutations in different genes, but in many cases, eventually result from lack of expression of corneodesmosin encoded by the CDSN gene (Mohamad et al., 2018; Has, 2018).

Although allergic diseases have been traditionally considered as primarily resulting from immunologic dysregulation, it is now clear that impaired epidermal barrier function might also contribute to the development of this group of disorders, as shown by the fact that deficiency of filaggrin, a major component of the epidermal barrier, is a strong risk factor for atopic diseases.

We have recently discovered that absence of filaggrin-2 in PSS patient's skin is associated with markedly decreased expression of corneodesmosin, which in turn may contribute to the peeling phenotype displayed by the patients in both types of PSS A and B. Over-expression of corneodesmosin in FLG2-deficient keratinocytes rescues the disadhesion phenotype (Mohamad et al., 2018).

SUMMARY OF INVENTION

Using a high throughput screening of small molecule libraries, utilizing green fluorescent protein (GFP) base reporter system and western blot analysis for validation of the results, it has now been found, in accordance with the present invention, that betulinic acid (which is already used as topical treatment on human skin, and capable of penetrating into the skin and be active in the epidermis while showing excellent safty profile) is capable of boosting corneodesmosin biosynthesis, and when administered to keratinocytes, it increases corneodesmosin expression by more than 3-fold (FIGS. 1-2), and may thus be used as an inducer of corneodesmosin expression in patients suffering from skin diseases or disorders associated with accelerated corneodesmosomes degradation and/or weaker cell-cell adhesion.

In one aspect, the present invention thus relates to a method for treatment of a skin disease or disorder associated with accelerated corneodesmosomes degradation and/or weaker cell-cell adhesion in a subject in need thereof, said method comprising administering, i.e., applying, to the skin of said subject a topical pharmaceutical composition comprising a topically acceptable oily carrier and a therapeutically effective amount of an active agent selected from betulinic acid, or a pharmaceutically acceptable salt, ester (e.g., an alkyl ester), or amide (e.g., an amino acid amide) thereof. Examples of such skin diseases or disorders include, without limiting, peeling skin syndrome (PSS) such as noninflammatory PSS (known as PSS type A), inflammatory PSS (known as PSS type B), and acral PSS, Netherton syndrome, and atopic dermatitis.

According to the present invention, the subject treated by the method disclosed herein preferably does not suffer from epidermolysis bullosa such as dystrophic epidermolysis bullosa and junctional epidermolysis bullosa, or from melanoma such as cutaneous metastatic melanoma.

In another aspect, the present invention relates to a topical pharmaceutical composition comprising a topically acceptable oily carrier and an active agent selected from betulinic acid, or a pharmaceutically acceptable salt, ester (e.g., an alkyl ester), or amide (e.g., an amino acid amide) thereof, for use in the treatment of a skin disease or disorder associated with accelerated corneodesmosomes degradation and/or weaker cell-cell adhesion.

In a further aspect, the present invention provides a topical pharmaceutical composition comprising an active agent selected from betulinic acid, or a pharmaceutically acceptable salt, ester (e.g., an alkyl ester), or amide (e.g., an amino acid amide) thereof, and a topically acceptable oily carrier.

DETAILED DESCRIPTION

Figure 1:
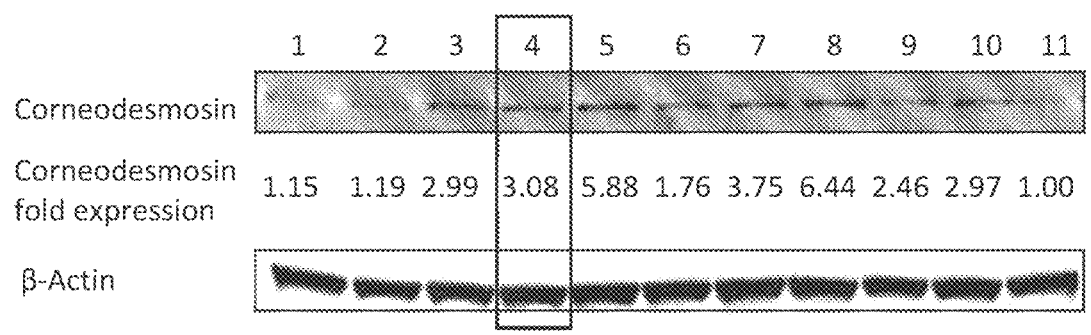
FIG. 1 shows corneodesmosin protein expression in human primary keratinocytes treated with different small molecules compounds (#1-10) and dimethyl sulfoxide (DMSO; #11), ascertained using immunoblotting with anti corneodesmosin antibody (β-actin served as a loading control). Corneodesmosin protein levels were quantified and normalized to β-actin protein levels and presented as corneodesmosin fold expression relative to normal keratinocytes treated with DMSO. Betulinic acid (#4) was found to increase the expression of corneodesmosin more than 3 fold. The other compounds shown in the figure are 5-aminolevulinic acid hydrochloride (5-ALA; #1), piperlongumine (#2), thiostrepton (#3), obatoclax mesylate (GX15-070; #5), BI 2536 (CAS No.: 755038-02-9; #6), PHA-665752 (CAS No.: 477575-56-7 (anhydrous; #7), YH239-EE (CAS No.: 1364488-67-4; #8), PF-562271 (CAS No.: 717907-75-0; #9), and BI-D1870 (CAS No.: 501437-28-1; #10).
Figure 2:
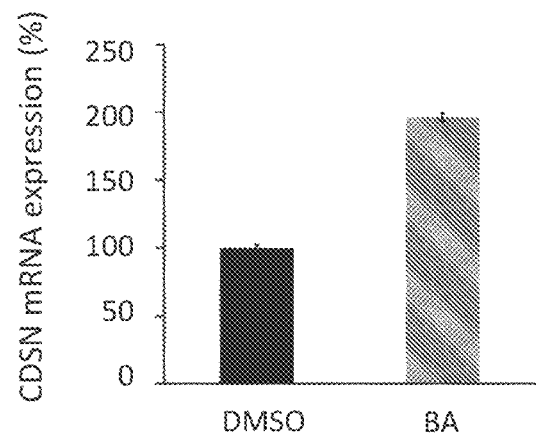
FIG. 2 shows that the CDSN expression at the mRNA level in normal keratinocytes treated with betulinic acid (BA) is 2-fold higher than in normal keratinocytes treated with DMSO.

Disclosed herein is a method for treatment of a skin disease or disorder associated with accelerated corneodesmosomes degradation and/or weaker cell-cell adhesion in a subject in need thereof, said method comprising administering, i.e., applying, to the skin of said subject a topical pharmaceutical composition comprising a topically acceptable oily carrier and a therapeutically effective amount of an active agent selected from betulinic acid, or a pharmaceutically acceptable salt, ester, or amide thereof.

The phrase "accelerated corneodesmosomes degradation" as used herein refers to a condition in which the number of corneodesmosomes or functional corneodesmosomes in the tissue is reduced (due to a mutation in one or more of the corneodesmosomes components) compared to that considered as normal, or the functionality of corneodesmosomes in said tissue is poor, i.e., reduced compared to that of normal ones, causing reduction in cell to cell adhission. Yet, as would be clear to any person skilled in the art, since the number of cell layers in the stratum corneum varies dramatically by the anatomical location (small in the genital skin, larger in the trunk, and extremely larger in the heel (Ya-Xian et al., 1999; Ishida-Yamamoto and Igawa, 2015), the term "normal" referring to the number of corneodesmosomes or functional corneodesmosomes in the epidermis does not mean a particular value but depends on the anatomical location. The number of corneodesmosomes or functional corneodesmosomes in the tissue may be measured using, e.g., the dispase (or dispase-based) dissociation assay, wherein keratinocytes are grown to confluence, epidermal sheets are then separated using dispase, and the resilience of the resulting epidermal sheets to mechanical stress is evaluated as previously described (Vodo et al., 2016).

The phrase "weaker cell-cell adhesion" as used herein refers to any situation (either genetic-based or not) that weakening the adhesion between cells below that considered as normal, as measured using, e.g., the dispase dissociation assay (which is always quantified as compared to normal epidermis).

In certain embodiments, the active agent comprised within the topical pharmaceutical composition administered is betulinic acid.

In other embodiments, the active agent comprised within the topical pharmaceutical composition administered is a pharmaceutically acceptable (i.e., non-toxic) salt of betulinic acid.

Particular pharmaceutically acceptable salts of betulibic acid include salts of ammonium ($NH_4^+$) or an organic cation derived from an amine of the formula $R_4N^+$, wherein each one of the Rs independently is selected from H, $C_1$-$C_{22}$, preferably $C_1$-$C_6$ alkyl, such as methyl, ethyl, propyl, isopropyl, n-butyl, sec-butyl, isobutyl, tert-butyl, n-pentyl, 2,2-dimethylpropyl, n-hexyl, and the like, phenyl, or heteroaryl such as pyridyl, imidazolyl, pyrimidinyl, and the like, or two of the Rs together with the nitrogen atom to which they are attached form a 3-7 membered ring optionally containing a further heteroatom selected from N, S and O, such as pyrrolydine, piperidine and morpholine. Other pharmaceutically acceptable salts of betulinic acid include metal salts such as alkali metal salts, e.g., lithium, sodium or potassium salts, and alkaline earth metal salts, e.g., calcium or magnesium salts.

The term "alkyl" typically means a linear or branched hydrocarbon radical having, e.g., 1-22 carbon atoms and includes methyl, ethyl, n-propyl, isopropyl, n-butyl, sec-butyl, isobutyl, tert-butyl, n-pentyl, isoamyl, 2,2-dimethylpropyl, n-hexyl, n-heptyl, n-octyl, n-nonyl, n-decyl, n-undecyl, n-dodecyl, n-tridecyl, n-tetradecyl, n-pentadecyl, n-hexadecyl, and the like. Preferred are ($C_1$-$C_6$)alkyl groups, more preferably $(C_1-C_4)$alkyl groups, most preferably methyl, ethyl, propyl, and isopropyl.

The term "heteroaryl" refers to a radical derived, e.g., from a 5-10-membered mono- or poly-cyclic heteroaromatic ring containing one to three, preferably 1-2, heteroatoms selected from N, O, or S. Examples of mono-cyclic heteroaryls include, without being limited to, pyrrolyl, furyl, thienyl, thiazinyl, pyrazolyl, pyrazinyl, imidazolyl, oxazolyl, isoxazolyl, thiazolyl, isothiazolyl, pyridyl, pyrimidinyl, 1,2,3-triazinyl, 1,3,4-triazinyl, and 1,3,5-triazinyl. Polycyclic heteroaryl radicals are preferably composed of two rings such as, but not limited to, benzofuryl, isobenzofuryl, benzothienyl, indolyl, quinolinyl, isoquinolinyl, imidazo[1,2-a]pyridyl, benzimidazolyl, benzthiazolyl, benzoxazolyl, pyrido[1,2-a]pyrimidinyl and 1,3-benzodioxinyl.

Further pharmaceutically acceptable salts of betulibic acid include salts of a cationic lipid or a mixture of cationic lipids. Cationic lipids are often mixed with neutral lipids prior to use as delivery agents. Neutral lipids include, but are not limited to, lecithins; phosphatidylethanolamine; diacyl phosphatidylethanolamines such as dioleoyl phosphatidylethanolamine, dipalmitoyl phosphatidylethanolamine, palmitoyloleoyl phosphatidylethanolamine and distearoyl phosphatidylethanolamine; phosphatidylcholine; diacyl phosphatidylcholines such as dioleoyl phosphatidylcholine, dipalmitoyl phosphatidylcholine, palmitoyloleoyl phosphatidylcholine and distearoyl phosphatidylcholine; phosphatidylglycerol; diacyl phosphatidylglycerols such as dioleoyl phosphatidylglycerol, dipalmitoyl phosphatidylglycerol and distearoyl phosphatidylglycerol; phosphatidylserine; diacyl phosphatidylserines such as dioleoyl- or dipalmitoyl phosphatidylserine; and diphosphatidylglycerols; fatty acid esters; glycerol esters; sphingolipids; cardiolipin; cerebrosides; ceramides; and mixtures thereof. Neutral lipids also include cholesterol and other 3β hydroxy-sterols.

Examples of cationic lipid compounds include, without being limited to, Lipofectin® (Life Technologies, Burlington, Ontario) (1:1 (w/w) formulation of the cationic lipid N-[1-(2,3-dioleyloxy)propyl]-N,N,N-trimethylammonium chloride and dioleoylphosphatidyl-ethanolamine); Lipofectamin™ (Life Technologies, Burlington, Ontario) (3:1 (w/w) formulation of polycationic lipid 2,3-dioleyloxy-N-[2(spermine-carboxamido)ethyl]-N,N-dimethyl-1-propanamin-iumtrifluoroacetate and dioleoylphosphatidyl-ethanolamine), Lipofectamine Plus (Life Technologies, Burlington, Ontario) (Lipofectamine and Plus reagent), Lipofectamine 2000 (Life Technologies, Burlington, Ontario) (Cationic lipid), Effectene (Qiagen, Mississauga, Ontario) (Non liposomal lipid formulation), Metafectene (Biontex, Munich, Germany) (Polycationic lipid), Eu-fectins (Promega Biosciences, San Luis Obispo, Calif.) (ethanolic cationic lipids numbers 1 through 12: $C_{52}H_{106}N_6O_4 \cdot 4CF_3CO_2H$, $C_{88}H_{178}N_8O_4S_2 \cdot 4CF_3CO_2H$, $C_{40}H_{84}NO_3P$. $CR_3CO_2H$, $C_{50}H_{103}N_7O_3 \cdot 4CF_3CO_2H$, $C_{55}H_{115}N_8O_2 \cdot 6CF_3CO_2H$, $C_{49}H_{102}N_6O_3 \cdot 4CF_3CO_2H$, $C_{44}H_{89}N_5O_3 \cdot 2CF_3CO_2H$, $C_{100}H_{206}N_{12}O_4S_2 \cdot 8CF_3CO_2H$, $C_{162}H_{330}N_{22}O_9 \cdot 13CF_3CO_2H$, $C_{43}H_{88}N_4O_2 \cdot 2CF_3CO_2H$, $C_{43}H_{88}N_4O_3 \cdot 2CF_3CO_2H$, $C_{41}H_{78}NO_8P$); Cytofectene (Bio-Rad, Hercules, Calif.) (mixture of a cationic lipid and a neutral lipid), GenePORTER® (Gene Therapy Systems, San Diego, Calif.) (formulation of a neutral lipid (Dope) and a cationic lipid) and FuGENE 6 (Roche Molecular Biochemicals, Indianapolis, Ind.) (Multi-component lipid based non-liposomal reagent).

In still other embodiments, the active agent comprised within the topical pharmaceutical composition administered is a betulinic acid ester such as an alkyl ester thereof, e.g., methyl-, ethyl-, n-propyl-, isopropyl-, n-butyl-, sec-butyl-, isobutyl-, tert-butyl-, n-pentyl-, isoamyl-, and n-hexyl-ester of betulinic acid.

In further embodiments, the active agent comprised within the topical pharmaceutical composition administered is an amide of betulinic acid, e.g., an amide of betulinic acid and an amino acid. The term "amino acid" as used herein refers to an organic compound comprising both amine and carboxylic acid functional groups, which may be either a natural or non-natural amino acid, and occur in both L and D isomeric forms. The twenty two natural amino acids are aspartic acid (Asp), tyrosine (Tyr), leucine (Leu), tryptophan (Trp), arginine (Arg), valine (Val), glutamic acid (Glu), methionine (Met), phenylalanine (Phe), serine (Ser), alanine (Ala), glutamine (Gln), glycine (Gly), proline (Pro), threonine (Thr), asparagine (Asn), lysine (Lys), histidine (His), isoleucine (Ile), cysteine (Cys), selenocysteine (Sec), and pyrrolysine (Pyl). Non-limiting examples of non-natural amino acids include diaminopropionic acid (Dap), diaminobutyric acid (Dab), ornithine (Orn), aminoadipic acid, β-alanine, 1-naphthylalanine, 3-(1-naphthyl)alanine, 3-(2-naphthyl)alanine, γ-aminobutiric acid (GABA), 3-(aminomethyl) benzoic acid, p-ethynyl-phenylalanine, p-propargly-oxy-phenylalanine, m-ethynyl-phenylalanine, p-bromophenylalanine, p-iodophenylalanine, p-azidophenylalanine, p-acetylphenylalanine, azidonorleucine, 6-ethynyl-tryptophan, 5-ethynyl-tryptophan, 3-(6-chloroindolyl) alanine, 3-(6-bromoindolyl)alanine, 3-(5-bromoindolyl) alanine, azidohomoalanine, p-chlorophenylalanine, α-aminocaprylic acid, O-methyl-L-tyrosine, N-acetylgalactosamine-α-threonine, and N-acetylgalactosamine-α-serine.

In certain embodiments, the topical pharmaceutical composition applied according to the method of the present invention, as defined in any one of the embodiments above, is administered to one or more, i.e., to one, two, three, four or more, sites (places) on the subject's skin. The term "site" or "place" as used herein with respect to the subject's skin refers to an anatomical location of the entire body surface. In particular embodiments, said composition is applied to more than one sites of the subject's skin such that practically the entire body surface, or more of it, is covered.

In certain embodiments, the topical pharmaceutical composition applied according to the method of the present invention, as defined in any one of the embodiments above, is administered once a day, twice a day, three times a day, or more, according to the necessity, e.g., one fingertip unit or more to each one of the arms. In particular embodiments, said composition is applied twice daily. The treatment period will be determined as deemed appropriate by the physician, but in most cases treatment will be applied for at least about three months. If proven effective, treatment may be continued following a same or different regimen (e.g., the same or lower number of applications daily) for maintaining benefit.

In certain embodiments, the topial pharmaceutical composition applied according to the method of the present invention, as defined in any one of the embodiments above, is formulated as an ointment, salve, cream, paste, lotion, or oil-in-water emulsion, but preferably as an ointment. In particular such embodiments, said topically acceptable oily carrier comprises at least one viscosity modifier, also referred to herein as viscosity-modifying agent or thickening agent. Examples of suitable viscosity modifier include, without being limited to, a mineral oil such as a paraffin oil and white petroleum (petroleum jelly); or a surfactant, e.g., a nonionic surfactant such as polysorbate 20 [polyoxyethylene (20) sorbitan monolaurate], polysorbate 40 [polyoxyethylene (20) sorbitan monopalmitate], polysorbate 60

[polyoxyethylene (20) sorbitan monostearate], polysorbate 80 [polyoxyethylene (20) sorbitan monooleate; Tween® 80], or a combination thereof. In more partiuclar such compositions, the topically acceptable oily carrier comprises a paraffin oil and white petroleum. Topical pharmaceutical compositions as defined herein may comprise up to about 20%, preferably from about 1% to about 15%, more preferably from about 3% to about 12%, e.g., about 3%, 4%, 5%, 6%, 7%, 8%, 9%, 10%, 11% or 12% by weight, of said active agent.

Betulinic acid, formulated as a gel, is currently used in clinical studies as topical treatment for dystrophic epidermolysis bullosa and junctional epidermolysis bullosa. In addition, a phase I clinical study is carried out to evaluate the safety and tolerability of betulinic acid, when administered for four weeks as a topical ointment in escalating doses to patients with cutaneous metastatic melanoma, and to evaluate the effect of escalating doses of topically applied betulinic acid on histological remission of cutaneous metastatic melanoma and induction of apoptotic biomarkers.

The method disclosed herein is therefore for treatment of a skin disease or disorder associated with accelerated corneodesmosomes degradation and/or weaker cell-cell adhesion, provided that the subject treated does not suffer from epidermolysis bullosa such as dystrophic epidermolysis bullosa and junctional epidermolysis bullosa, or from melanoma such as cutaneous metastatic melanoma.

Examples of skin diseases or disorders associated with accelerated corneodesmosomes degradation and/or weaker cell-cell adhesion include, without limiting, PSS such as noninflammatory PSS (known as PSS type A), inflammatory PSS (known as PSS type B), or acral PSS, Netherton syndrome, or atopic dermatitis.

In certain embodiments, the method disclosed herein further comprises applying to the skin of the subject treated a moisturizer such as vaseline, or a dressing such as a vaseline gauze; or administering to said subject, either topically or systemically, an antibiotic agent in case of secondary infection.

The term "subject" as used herein refers to any mammal, e.g., a human, non-human primate, horse, ferret, dog, cat, cow, and goat. In a preferred embodiment, the term "subject" denotes a human, i.e., an individual.

The term "treatment" as used herein refers to the administering of a therapeutic amount of an active agent selected from betulinic acid, or a pharmaceutically acceptable salt, ester, or amide thereof, which is effective to increase corneodesmosin expression and consequently treat skin diseases or disorders associated with accelerated corneodesmosomes degradation and/or weaker cell-cell adhesion. In order to be effective, the topical pharmaceutical composition administered to the skin of the subject should be applied such that it completely covers each one of the sites treated. As stated above, treatment will include application of the topical pharmaceutical composition once a day, twice a day, three times a day, or more, e.g., one fingertip unit or more to each one of the arms at a time, for a period of at least three months, and if proven effective, treatment may be continued following a same or different regimen to maintain benefit. Patients assessment will include clinical assessment using the Physician global assessment (PGA) score (wherein 0 represents very mild (0-20%) improvement; 1 represents mild (21-40%) improvement; 2 represents moderate (41-60%) improvement; 3 represents marked (61-80%) improvement; and 4 represents near total (81-100%) improvement); as well as a modified Nikolsky's sign scoring (AG, 2018; Goddman, 1953; Hameed and Khan, 1999), wherein 0 represents intact skin with no exfoliation; 1 represents partial skin exfoliation; and 2 represents full exfoliation). Nikolsky's assessment will be done by applying tangential pressure using the thumb finger on the examined skin, first in one direction for 30 seconds and then at right angles to it for another 30 seconds.

In another aspect, the present invention relates to a topical pharmaceutical composition comprising a topically acceptable oily carrier and an active agent selected from betulinic acid, or a pharmaceutically acceptable salt, ester, or amide thereof, for use in the treatment of a skin disease or disorder associated with accelerated corneodesmosomes degradation and/or weaker cell-cell adhesion. In certain embodiments, the active agent comprised within said composition is betulinic acid. In other embodiments, said active agent is a pharmaceutically acceptable salt of betulinic acid. In still other embodiments, the active agent comprised within the composition is a betulinic acid ester, e.g., an alkyl ester thereof. In further embodiments, said active agent is an amide of betulinic acid, e.g., an amide of betulinic acid and an amino acid.

In certain embodiments, the topical pharmaceutical composition of the invention, as defined in any one of the embodiments above, is to be administered to one or more, i.e., to one, two, three, four or more, sites (places) on the subject's skin. In other embodiments, said composition is to be administered once a day, twice a day, three times a day, or more.

In a further aspect, the present invention provides a topical pharmaceutical composition comprising an active agent selected from betulinic acid, or a pharmaceutically acceptable salt, ester, or amide thereof, and a topically acceptable oily carrier. In certain embodiments, the active agent comprised within said composition is betulinic acid. In other embodiments, said active agent is a pharmaceutically acceptable salt of betulinic acid. In still other embodiments, the active agent comprised within the composition is a betulinic acid ester, e.g., an alkyl ester thereof. In further embodiments, said active agent is an amide of betulinic acid, e.g., an amide of betulinic acid and an amino acid.

Topial pharmaceutical compositions as disclosed herein may be formulated as ointments, salves, creams, pastes, lotions, or oil-in-water emulsions, but preferably as ointments. In particular such compositions, said topically acceptable oily carrier comprises at least one viscosity modifier as defined above, and more partiuclar such compositions are those wherein the topically acceptable oily carrier comprises a paraffin oil and white petroleum. The topical pharmaceutical compositions disclosed may comprise up to about 20%, preferably from about 1% to about 15%, more preferably from about 3% to about 12%, e.g., about 3%, 4%, 5%, 6%, 7%, 8%, 9%, 10%, 11% or 12% by weight, of said active agent.

Unless otherwise indicated, all numbers referring, e.g., to the content of the active agent in the compositions disclosed, used in the present specification are to be understood as being modified in all instances by the term "about". Accordingly, unless indicated to the contrary, the numerical parameters set forth in this description and claims are approximations that may vary by up to plus or minus 10% depending upon the desired properties sought to be obtained by the invention.

The invention will now be illustrated by the following non-limiting Examples.

EXAMPLES

Figure 3A:
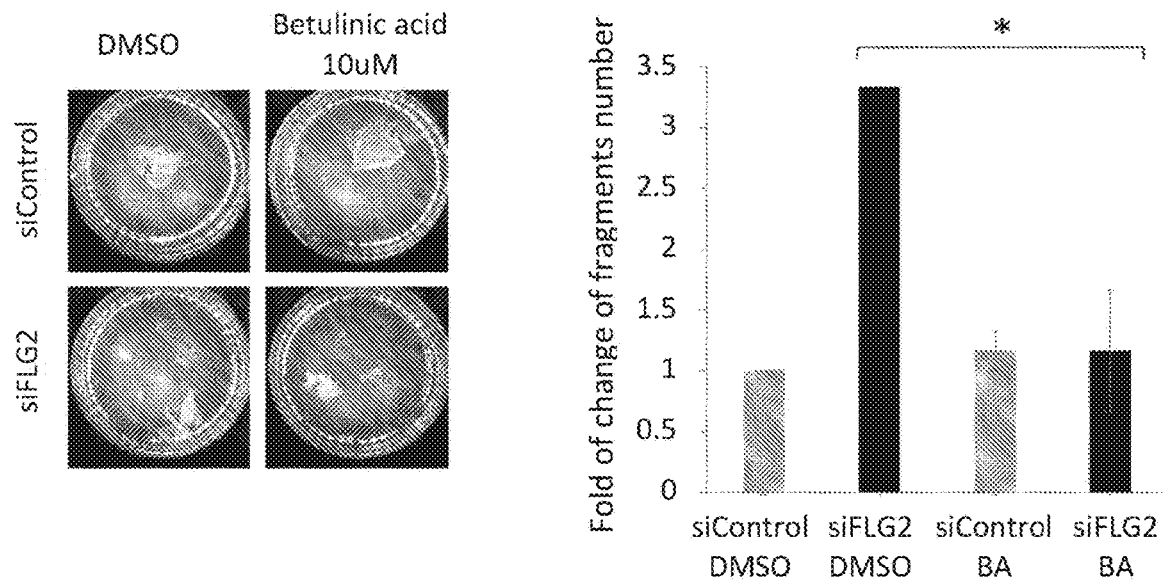
FIGS. 3A-3B show that betulinic acid (BA) is capable of rescuing the keratinocytes disadhesion phenotype in keratinocytes downregulated for FLG2 expression. (3A) Normal keratinocytes were transfected with either FLG2-specific siRNA or control siRNA, and were treated with DMSO (vehicle) or 10 μM of betuliic acid. (3B) Patient keratinocytes were treated with DMSO (vehicle) or 10 μM of betulinic acid. Epidermal sheets were released from the tissue plates with dispase and subjected to mechanical stress (left panel); the resulting fragments were counted (right panel). Results are expressed as number of fragments±SEM (two sided t-test; *p<0.05).
Figure 3B:
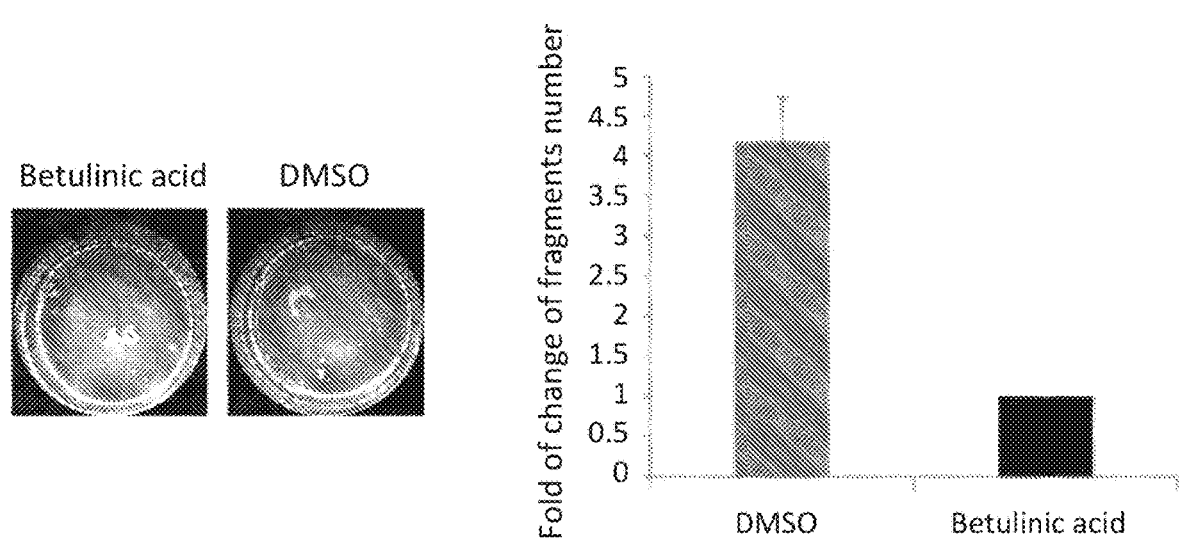

Example 1: Betulinic Acid Rescues the Keratinocytes Disadhesion Phenotype in Keratinocytes Downregulated for FLG2 in Both Normal and PSS Patient Keratinocytes In order to test the therapeutic potential of betulinic acid, the dispase dissociation assay (Mohamad et al., 2018; Vodo et al., 2016) was used. Normal keratinocytes were transfected with either FLG2-specific small interfering RNA (siRNA) or control siRNA, and were treated with either dimethyl sulfoxide (DMSO, vehicle) or 10 µM of betulinic acid. Patient keratinocytes were treated with either DMSO (vehicle) or 10 µM of betulinic acid. In all experiments, epidermal sheets were then released from the tissue plates with dispase (a protease that cleaves fibronectin, collagen IV, and to a lesser extent collagen I) and subjected to mechanical stress, and the resulting fragments were counted. As found, betulinic acid was able to rescue the keratinocytes disadhesion phenotype in keratinocytes downregulated for FLG2 in both normal and PSS patient keratinocytes (FIG. 3).

The results suggest that betulinic acid may be of therapeutic benefit for patients affected with skin diseases or disorders associated with accelerated corneodesmosomes degradation and/or weaker cell-cell adhesion, e.g., PSS and atopic dermatitis.

Example 2: The Efficacy of Topical Betulinic Acid Ointment in Treatment of Hereditary PSS type A and Netherton Syndrome The present study is aimed at assessing the short and long term efficacy of topical 10% betulinic acid ointment for treatment of hereditary PSS type A and Netherton syndrome. The study is designed as an open label, two arm, prospective study, and include 5 patients with PSS type A and 5 patients with Netherton syndrome.

Inclusion criteria. Patients or 18 years old or more, with genetically-confirmed PSS type A or Netherton syndrome. Informed consent will be obtained from participating patients.

Exclusion criteria. Pregnancy and breastfeeding.

Study protocol. All subjects will be treated with topical 10% betulinic acid ointment applied twice daily (1 fingertip unit (FTU)) to the left forearm. The right forearm will be treated with 0% betulinic acid ointment (vehicle ointment) applied twice daily. Total study period will be 3 months.

Other Medications. Patients will be instructed to avoid any other topical therapy to the upper extremities during study period; however, will be allowed to continue their daily oral medications.

End-points. The end point will be the effect of treatment on skin integrity and disease manifestations in the treated left forearm as compared to untreated right forearm (control). Clinical manifestations and skin integrity using physical challenge will be evaluated at enrollment and every 4 weeks till the end of the study following 3 months of treatment.

Follow-up. Patients will be examined/assessed at baseline and every 4 weeks, and in addition will be instructed to undergo general blood examination tests at baseline and every 4 weeks (as summarized in Table 1). Patients assessment will include the following methods:

1. Physician global assessment (PGA) score, wherein (0) 0-20% represents very mild improvement; (1) 21-40% represents mild improvement; (2) 41-60% represents moderate improvement; (3) 61-80% represents marked improvement; and (4) 81-100% represents near total improvement.
2. Photographic documentation (will be examined by five independent evaluators at the end of the study, and an average PGA score will be assessed).
3. Patient assessment using a simple scale for change in the skin condition, for the correlation of patient appreciation of changes in skin condition with the PGA, wherein (0) represents no change; and (1), (2) and (3) represent slightly, moderately, and greatly improved skin condition, respectively.

At the end of the study, the skin condition of the patient treated will be further assessed using a modified Nikolsky's sign scoring (A G, 2018; Goddman, 1953; Hameed and Khan, 1999), wherein 0 represents intact skin with no exfoliation; 1 represents partial skin exfoliation; and 2 represents full exfoliation). In short, tangential pressure will be applied using the thumb finger on the examined skin, first in one direction for 30 seconds and then at right angles to it for another 30 seconds, always by the same physician).

Study withdrawal. Patients with serious side effects that according to the investigator judgment might jeopardize the patient's health. No serious side effects are expected.

Salvage treatment. Upon exacerbation patients will be treated according to standard regimen as instructed by physician.

Statistical analysis. Analysis of differences in skin integrity and skin clinical symptoms between baseline and follow up visits, as well as between the treated and untreated skin, will be performed in terms of epidemiologic parameters and the different scores (PGA, Nikolsky's sign, and Patient assessment scoring). Categorical variables will be compared using the chi square test. Continuous variables will be calculated using the student's t-test and Mann Whitney U-test.

TABLE 1

Patients assessment at enrollment, during the study, and at the end of it

| Enrollment | Follow up visits (every 4 weeks for a total of 3 months) | End visit (3 months) |
|---|---|---|
| Inclusion and exclusion criteria Enrollment baseline lab tests: Full blood count with white blood cell differential Serum electrolytes (Na, K, Ca, Cl, P), glucose levels, urea, creatinine Serum total protein, albumin, | Blood tests: Full blood count with white blood cell differential Physical exam (including PGA) Patients self-assessment scale Photographs Modified Nikolsky's sign scoring | Blood tests: Full blood count with white blood cell differential Serum electrolytes (Na, K, Ca, Cl, P), glucose levels, urea, creatinine Serum total protein, albumin, ALT, AST, AP, GGT |

TABLE 1-continued

Patients assessment at enrollment, during the study, and at the end of it

| Enrollment | Follow up visits (every 4 weeks for a total of 3 months) | End visit (3 months) |
|---|---|---|
| ALT, AST, AP, GGT<br>Physical exam (including PGA)<br>Patients self-assessment scale<br>Photographs<br>Modified Nikolsky's sign scoring | | Physical exam (including PGA)<br>Patients self-assessment scale<br>Photographs and assessment of<br>PGA average score (by five<br>independent evaluators)<br>Modified Nikolsky's sign scoring |

REFERENCES

A G S. Nikolsky's sign—A clinical method to evaluate damage at epidermal-dermal junction. *J Indian Acad Oral Med Radiol* 2018, 30, 68-72

Alfares A, Al-Khenaizan S, Al Mutairi F. Peeling skin syndrome associated with novel variant in FLG2 gene. *American journal of medical genetics Part A.* 2017, 173(12), 3201-3204

Blaydon D C, Nitoiu D, Eckl K M, Cabral R M, Bland P, Hausser I, van Heel D A, Rajpopat S, Fischer J, Oji V, Zvulunov A, Traupe H, Hennies H C, Kelsell D P. Mutations in CSTA, encoding Cystatin A, underlie exfoliative ichthyosis and reveal a role for this protease inhibitor in cell-cell adhesion. *American journal of human genetics.* 2011, 89(4), 564-571

Bolling M C, Jan S Z, Pasmooij AM G, Lemmink H H, Franke L H, Yenamandra V K, Sinke R J, van den Akker P, Jonkman M F. Generalized ichthyotic peeling skin syndrome due to FLG2 mutations. *The Journal of investigative dermatology.* 2018, 138(8), 1881-1884

Cabral R M, Kurban M, Wajid M, Shimomura Y, Petukhova L, Christiano A M. Whole-exome sequencing in a single proband reveals a mutation in the CHST8 gene in autosomal recessive peeling skin syndrome. *Genomics.* 2012, 99(4), 202-208

Candi E, Schmidt R, Melino G. The cornified envelope: a model of cell death in the skin. Nature reviews. *Molecular cell biology.* 2005, 6(4), 328-340

Cassidy A J, van Steensel M A, Steijlen P M, van Geel M, van der Velden J, Morley S M, Terrinoni A, Melino G, Candi E, McLean W H I. A homozygous missense mutation in TGMS abolishes epidermal transglutaminase 5 activity and causes acral peeling skin syndrome. *American journal of human genetics.* 2005, 77(6), 909-917

Egawa G, Kabashima K. Barrier dysfunction in the skin allergy. *Allergology international: official journal of the Japanese Society of Allergology.* 2018, 67(1), 3-11

Garrod D, Chidgey M. Desmosome structure, composition and function. *Biochimica et biophysica acta.* 2008, 1778 (3), 572-587

Goodman H. Nikolsky sign; page from notable contributors to the knowledge of dermatology. AMA Arch Derm Syphilol. 1953, 68(3), 334-335

Hameed A, Khan A A. Microscopic Nikolsky's sign. *Clin Exp Dermatol.* 1999, 24(4), 312-314

Has C. Peeling skin fisorders: A paradigm for skin desquamation. *The Journal of investigative dermatology.* 2018, 138(8), 1689-1691

Houben E, De Paepe K, Rogiers V. A keratinocyte's course of life. *Skin pharmacology and physiology.* 2007, 20(3), 122-132

Ishida-Yamamoto A, Igawa S. The biology and regulation of corneodesmosomes. *Cell and tissue research.* 2015, 360 (3), 477-482

Kemeny L, Nagy N, Csoma Z, Szabo K, Eros G. Pharmacological targeting of the epidermal barrier. *Current pharmaceutical design.* 2016, 22(35), 5373-5381

Kose O, Safali M, Koc E, Arca E, Acikgoz G, Ozmen I, Yeniay Y. Peeling skin diseases: 21 cases from Turkey and a review of the literature. *Journal of the European Academy of Dermatology and Venereology: JEADV.* 2012, 26(7(, 844-848

Krunic A L, Stone K L, Simpson M A, McGrath J A. Acral peeling skin syndrome resulting from a homozygous nonsense mutation in the CSTA gene encoding cystatin A. *Pediatric dermatology.* 2013, 30(5), e87-88

Levy S B, Goldsmith L A. The peeling skin syndrome. *Journal of the American Academy of Dermatology.* 1982, 7(5), 606-613

Matsumoto M, Zhou Y, Matsuo S, Nakanishi H, Hirose K, Oura H, Arase S, Ishida-Yamamoto A, Bando Y, Izumi K, Kiyonari H, Oshima N, Nakayama R, Matsushima A, Hirota F, Mouri Y, Kuroda N, Sano S, Chaplin D D. Targeted deletion of the murine corneodesmosin gene delineates its essential role in skin and hair physiology. *Proceedings of the National Academy of Sciences of the United States of America.* 2008, 105(18), 6720-6724

Mohamad J, Sarig O, Godsel L M, Peled A, Malchin N, Bochner R, Vodo D, Rabinowitz T, Pavlovsky M, Taiber S, Fried M, Eskin-Schwartz M, Assi S, Shomron N, Uitto J, Koetsier J L, Bergman R, Green KJ, Sprecher E. Filaggrin 2 deficiency results in abnormal cell-cell adhesion in the cornified cell layers and causes peeling skin syndrome type A. *The Journal of investigative dermatology.* 2018, 138(8), 1736-1743

Oji V, Eckl K M, Aufenvenne K, Natebus M, Tarinski T, Ackermann K, Seller N, Metze D, Nurnberg G, Folster-Holst R, Schafer-Korting M, Hausser I, Traupe H, Hennies H C. Loss of corneodesmosin leads to severe skin barrier defect, pruritus, and atopy: unraveling the peeling skin disease. *American journal of human genetics.* 2010, 87(2), 274-281

Pigors M, Sarig O, Heinz L, Plagnol V, Fischer J, Mohamad J, Malchin N, Rajpopat S, Kharfi M, Lestringant G G, Sprecher E, Kelsell D P, Blaydon D. Loss-of-function mutations in SERPINB8 linked to exfoliative ichthyosis with impaired mechanical stability of intercellular adhesions. *American journal of human genetics.* 2016, 99(2), 430-436

Samuelov L, Sprecher E. Peeling off the genetics of atopic dermatitis-like congenital disorders. *The Journal of allergy and clinical immunology.* 2014, 134(4), 808-815

Vodo Dm Sarig O, Geller S, Ben-Asher E, Olender T, Bochner R, Goldberg I, Nosgorodsky J, Alkelai A, Tatarskyy P, Peled A, Baum S, Barzilai A, Ibrahim S M, Zillikens D, Lancet D, Sprecher E. Identification of functional risk variant for Pemphigus Vulgaris in the ST18 gene. *PLoS Genet.* 2016 12(5), e1006008

Ya-Xian Z, Suetake T, Tagami H. Number of cell layers of the stratum corneum in normal skin—relationship to the anatomical location on the body, age, sex and physical parameters. *Arch Dermatol Res,* 1999, 291, 555

The invention claimed is:

1. A method for treatment of a skin disease or disorder associated with accelerated corneodesmosomes degradation and/or weaker cell-cell adhesion in a subject in need thereof, comprising administering/applying to the skin of said subject a topical pharmaceutical composition comprising a topically acceptable oily carrier and a therapeutically effective amount of an active agent selected from the group consisting of betulinic acid and a pharmaceutically acceptable salt, ester, or amide thereof, wherein said skin disease or disorder is peeling skin syndrome (PSS).

2. The method of claim 1, wherein said active agent is betulinic acid or a pharmaceutically acceptable salt thereof.

3. The method of claim 1, wherein said active agent is betulinic acid ester.

4. The method of claim 1, wherein said active agent is betulinic acid amide.

5. The method of claim 1, wherein said topical pharmaceutical composition is administered to one or more sites on the subject's skin.

6. The method of claim 1, wherein said topical pharmaceutical composition is administered once, twice, or thrice a day.

7. The method of claim 1, wherein said topical pharmaceutical composition is formulated as an ointment, salve, cream, paste, lotion, or oil-in-water emulsion.

8. The method of claim 7, wherein said topically acceptable oily carrier comprises at least one viscosity-modifying agent.

9. The method of claim 8, wherein said topically acceptable oily carrier comprises a paraffin oil and white petroleum.

10. The method of claim 7, wherein said topical pharmaceutical composition comprises up to about 20%, by weight, of said active agent.

11. The method of claim 1, wherein said subject does not suffer from epidermolysis bullosa, or from melanoma.

12. The method of claim 8, wherein said viscosity-modifying agent is a mineral oil or a surfactant.

13. The method of claim 11, wherein said epidermolysis bullosa is dystrophic epidermolysis bullosa or junctional epidermolysis bullosa, and said melanoma is cutaneous metastatic melanoma.

14. The method of claim 1, wherein said peeling skin syndrome (PSS) is noninflammatory PSS, inflammatory PSS, or acral PSS.

15. The method of claim 1, wherein said topical pharmaceutical composition is formulated as an ointment, and said active agent is betulinic acid.

16. The method of claim 15, wherein said PSS is noninflammatory PSS.

* * * * *